(12) United States Patent
Huang et al.

(10) Patent No.: US 12,317,097 B2
(45) Date of Patent: *May 27, 2025

(54) SYSTEM AND METHOD FOR INTELLIGENT THROUGHPUT PERFORMANCE ANALYSIS AND ISSUE DETECTION

(71) Applicant: Dell Products LP, Round Rock, TX (US)

(72) Inventors: Wei-Chia Huang, Taipei (TW); Chuang-Yueh Chen, Bangiao District (TW); YungShun Lin, Da'an District (TW); Alan Eric Sicher, Taipei (TW); Lars Fredrik Proejts, Zhongshan District (TW)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,501

(22) Filed: Feb. 26, 2024

(65) Prior Publication Data

US 2024/0205693 A1    Jun. 20, 2024

Related U.S. Application Data

(63) Continuation of application No. 17/539,986, filed on Dec. 1, 2021, now Pat. No. 11,917,422.

(51) Int. Cl.
*G06N 3/02* (2006.01)
*G06N 3/08* (2023.01)
(Continued)

(52) U.S. Cl.
CPC .............. *H04W 16/22* (2013.01); *G06N 3/02* (2013.01); *G06N 3/08* (2013.01); *H04B 17/318* (2015.01);
(Continued)

(58) Field of Classification Search
CPC ....... G06N 3/02–105; G06N 20/00–20; H04B 7/02–12; H04B 17/0082–3913;
(Continued)

(56) References Cited

U.S. PATENT DOCUMENTS 7,555,468 B2    6/2009    El-Damhougy
8,369,792 B2    2/2013    Townley
(Continued)

*Primary Examiner* — Timothy J Weidner
(74) *Attorney, Agent, or Firm* — Prol Intellectual Property Law, PLLC; H. Kenneth Prol

(57) ABSTRACT

An information handling system executing an intelligent throughput performance analysis and issue detection system may comprise a network interface device to establish a wireless link with a wireless network and a processor to execute a neural network trained to predict wireless link throughput values based on controlled connectivity testing metrics gathered in a controlled laboratory from tested information handling systems. The processor may gather measured throughput of the wireless link and operational connectivity metrics for the information handling system that describe antenna positional information, antenna adaptation controller parameters, signal strength measurements, and wireless link performance metrics. The neural network may output, based on the gathered operational connectivity metrics a predicted throughput value that differs from the measured throughput by a maximum tolerance. The network interface device may transmit a notification of erroneously predicted throughput, the neural network output, and the operational connectivity metrics to a remote neural network training platform for retraining.

20 Claims, 4 Drawing Sheets

(51) Int. Cl.

| | | |
|---|---|---|
| *H04B 17/318* | (2015.01) | |
| *H04B 17/391* | (2015.01) | |
| *H04L 41/147* | (2022.01) | |
| *H04L 41/16* | (2022.01) | |
| *H04L 43/04* | (2022.01) | |
| *H04L 43/0888* | (2022.01) | |
| *H04W 8/22* | (2009.01) | |
| *H04W 16/22* | (2009.01) | |
| *H04W 24/02* | (2009.01) | |
| *H04W 24/10* | (2009.01) | |
| *H04W 84/02* | (2009.01) | |
| *H04W 88/18* | (2009.01) | |
| *H04W 92/02* | (2009.01) | |
| *H04W 92/04* | (2009.01) | |

(52) U.S. Cl.
CPC ....... *H04B 17/3913* (2015.01); *H04L 41/147* (2013.01); *H04L 41/16* (2013.01); *H04L 43/04* (2013.01); *H04L 43/0888* (2013.01); *H04W 8/22* (2013.01); *H04W 24/02* (2013.01); *H04W 24/10* (2013.01); *H04W 84/02* (2013.01); *H04W 88/18* (2013.01); *H04W 92/02* (2013.01); *H04W 92/04* (2013.01)

(58) Field of Classification Search
CPC ... H04L 41/02–5096; H04L 43/02–55; H04W 8/18–245; H04W 16/18–225; H04W 24/02–10; H04W 28/02–26; H04W 36/0005–385; H04W 48/02–20; H04W 56/001–0025; H04W 72/02–569; H04W 74/002–0891; H04W 84/005–22; H04W 88/005–188; H04W 92/02–24
See application file for complete search history.

(56) References Cited

U.S. PATENT DOCUMENTS

| | | | |
|---|---|---|---|
| 9,007,953 | B1 | 4/2015 | Broyles |
| 9,154,984 | B1 | 10/2015 | Jain |
| 9,552,550 | B2 | 1/2017 | Vasseur |
| 9,775,160 | B2 | 9/2017 | Schmidt |
| 11,917,422 | B2 * | 2/2024 | Huang .................. H04W 16/22 |
| 2017/0118101 | A1 | 4/2017 | Veron |

* cited by examiner

SYSTEM AND METHOD FOR INTELLIGENT THROUGHPUT PERFORMANCE ANALYSIS AND ISSUE DETECTION

This application is a continuation of prior application Ser. No. 17/539,986, entitled "SYSTEM AND METHOD FOR INTELLIGENT THROUGHPUT PERFORMANCE ANALYSIS AND ISSUE DETECTION," filed on Dec. 1, 2021, which is assigned to the current assignee hereof and is incorporated herein by reference in its entirety.

FIELD OF THE DISCLOSURE

The present disclosure generally relates to wireless communication performance for computing devices. More specifically, the present disclosure relates to an intelligent system for predicting wireless link throughput performance based on a plurality of operating conditions for the computing device in real time.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
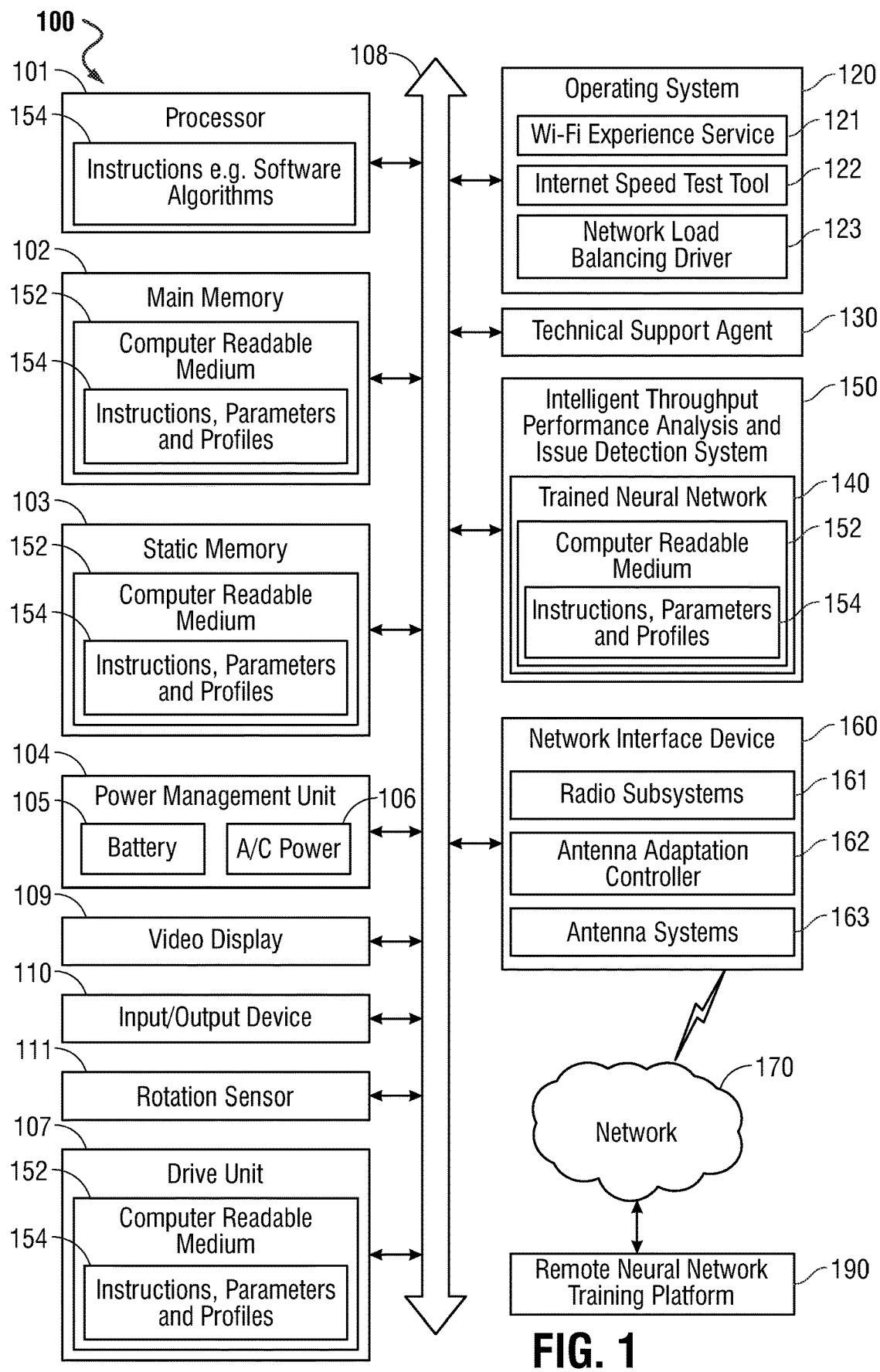
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

User wireless throughput, and consequently customer satisfaction regarding internet connectivity may be affected by several factors relating to the computing device and its surrounding environment. Connection issues and low throughput can cause significant customer dissatisfaction and result in calls to or visits from technical support. In many cases, it is difficult to remotely diagnose the cause of low throughput, due to the influence of network factors and environmental factors surrounding the computing device that cannot easily be detected or analyzed by remotely located technical support specialists. A method is needed to remotely diagnose such causes of low throughput, and to consequently decrease the volume of technical support visits and calls.

A neural network training platform located remotely from the computing devices in embodiments of the present disclosure addresses these issues by training and continuously updating a machine learning model such a neural network that is capable of modeling relationships between these network factors and environmental factors that are difficult to assess remotely, and the resultant throughput of wireless links established by those information handling systems. The neural network in an embodiment may be trained using controlled connectivity testing metrics describing antenna positional information, antenna adaptation controller parameters, signal strength measurements, and wireless link performance metrics for a plurality of information handling systems undergoing testing in a laboratory prior to shipment to end users, for example. Each of these values, gathered in a controlled laboratory, may be input into a multi-layer feed-forward neural network to output a predicted throughput value matching a measured throughput value for wireless links established in the testing environment described by the controlled connectivity testing metrics. The trained neural network may then be loaded, downloaded, or updated onto each of the tested information handling systems for execution during operation of the information handling systems by the end user.

During such operation by the end user, an intelligent throughput performance analysis and issue detection system executing the trained neural networks on each of the information handling systems may continuously gather operational connectivity metrics (e.g., similar to the controlled connectivity testing metrics gathered during laboratory testing described above and used to train the neural network but during end user environment usage). The intelligent throughput performance analysis and issue detection system in an embodiment may execute the trained neural networks to routinely test their abilities to accurately predict throughput values based on these input operational connectivity metrics. When the trained neural network fails to accurately predict throughput values for a specific set of operational connectivity metrics describing an environment in which an information handling system is being operating by the end user (e.g., in the field), this may indicate a need to retrain the neural network. In other words, the neural network may not have been trained to anticipate the effects of that specific environment on throughput values for wireless links established in that environment. Thus, the neural network may need to be retrained to more accurately model the relationship between measured throughput values and the specific set of operational connectivity metrics that were input into the trained neural network to produce an erroneous or inaccurate predicted throughput value.

In order to facilitate such retraining of the neural network, the information handling system executing the trained neural network to output an erroneously predicted throughput value may transmit telemetry of prediction error reporting, including a notification of such an erroneous output to the remotely-located, or cloud-based neural network training platform. The intelligent throughput performance analysis and issue detection system in an embodiment may also transmit the input values (e.g., operational connectivity metrics) that were input into the trained neural network at the information handling system to produce the erroneous output, and the measured throughput value (e.g., actual throughput value that did not match the predicted throughput value output by the neural network). The neural network training platform in an embodiment may then retrain the neural network to accurately model the relationship between these received operational connectivity metrics and the measured or actual throughput value. In such a way, the neural network training platform may retrain the neural network to accurately anticipate the effects of the specific environment described by those operational connectivity metrics on throughput values for wireless links established in that environment. Upon retraining of the neural network in such a way, the neural network training platform may transmit retuned weight matrices modeling the retrained neural network to each of the plurality of information handling systems, for loading of a retrained neural network. By consistently testing, retraining, and updating the neural networks operating at each of the information handling systems in such a way, the intelligent throughput performance analysis and issue detection systems operating at each of the plurality of information handling systems and the neural network training platform may efficiently and accurately model the influence of myriad network factors and environmental factors in which information handling systems may be operating on throughput values, for assisting in remotely diagnosing causes of low throughput.

FIG. 1 illustrates an information handling system 100 according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile computing device, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palm-top computer, a laptop computer, a tablet computer, a desktop computer, an augmented reality system, a virtual reality system, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In an embodiment, the information handling system may include an intelligent throughput performance analysis and issue detection system 150 that may be any device or devices that execute instructions, parameter, and profiles 154 of a trained neural network 170 to accurately predict throughput values for wireless links established between the network interface device 160 and network 170. The information handling system 100 may include a memory 102, (with computer readable medium 152 that is volatile (e.g. random-access memory, etc.), nonvolatile memory (read-only memory, flash memory etc.) or any combination thereof), one or more processing resources, such as a central processing unit (CPU), a graphics processing unit (GPU), either of which may be the processor 101 illustrated in FIG. 1, hardware or software control logic, or any combination thereof. Additional components of the information handling system 100 may include one or more storage devices 103 or 107, a network interface device 160, one or more communications ports for communicating with external devices, as well as various input and output (I/O) devices 110, such as a keyboard, a mouse, or any combination thereof. A power management unit 104 supplying power to the information handling system 100, via a battery 105 or an alternating current (A/C) power adapter 106 may supply power to one or more components of the information handling system 100, including the processor 101, the network interface device 160, and the integrated sensor hub 111. In an embodiment, the information handling system 100 may include plural orientation and position sensors such as a magnetometer, other reference sensor, gyroscope, accelerometer, and other sensors. The information handling system 100 and its sensors may be capable of determining antenna positional information, such as an angle of a video display 109 with respect to a base chassis enclosing the network interface device 160 and antenna systems 163.

The information handling system 100 may further include video display 109. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein and operates to perform one or more of the methods described herein. The information handling system 100 may execute code instructions 154 that may operate on servers or systems, remote data centers, or on-box in individual client information handling systems 100 according to various embodiments herein. In some embodiments, it is understood any or all portions of code instructions 154 may operate on a plurality of information handling systems 100.

The information handling system 100 may include a processor 101 such as a central processing unit (CPU), a GPU, embedded controllers or control logic or some combination of the same. Any of the processing resources may operate to execute code that is either firmware or software code. Moreover, the information handling system 100 may include memory such as main memory 102, static memory 103, containing computer readable medium 152 storing instructions 154. Instructions 154 may include an intelligent throughput performance analysis and issue detection system 150, operating system (OS) software 120, application software, BIOS software, or other software applications or drivers detectable by processor type 101.

The OS 120 in an embodiment may be capable of executing a plurality of software applications, including, for example, a Wi-Fi experience service 121, an internet speed test tool 122, and a network load balancing driver 123. The Wi-Fi experience service application 121 in an embodiment may track bandwidth of all other software applications pursuant to which data is transferred via a wireless link to the network 170 and may alert a technical support software agent 130 when available bandwidth does not meet bandwidth requirements for any of these tracked software applications. The Internet speed test tool application 122 in an embodiment may operate to measure a plurality of internet connection performance values, such as download speed, upload speed, latency, jitter, packet loss, date of testing, and location of the information handling system 100 and any network Access Points (APs) within network 170 with which a wireless link has been established. The network load balancing driver 123 in an embodiment may operate to balance the transceiving of data packets pursuant to execution of software applications by the OS 120 across a plurality of network interface devices (e.g., 160). A technical support software agent 130 in an embodiment may operate to transmit a notification of low throughput values detected by the internet speed test tool 122, the Wi-Fi experience service 121, or the intelligent throughput performance analysis and issue detection system 150 to a remote technical support software agent system (e.g., as described below with respect to FIG. 2) for possible remediation or reconfiguration of the information handling system 100. As described in greater detail with respect to FIG. 2, the technical support software agent system may initiate one or more remediation steps, or may issue a ticket for an individual such as an IT professional to begin such remediation or reconfiguration steps.

The disk drive unit 107 and static memory 103 may also contain space for data storage in a computer readable medium 152. The instructions 154 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices, display 109, or the network interface device 160, or the like.

Information handling system 100 in an embodiment may comprise a mobile computing device, such as a laptop or tablet computer, as described in greater detail herein, or may, in some embodiments, comprise a docking station for such a mobile computing device. The information handling system 100 in such an embodiment may operate on wired and wireless links to connect with the network 170 via a network Access Point (AP), as described in greater detail herein.

The network interface device 160 may provide connectivity of the information handling system 100 to the network 170 via a network AP in an embodiment. The network 170 in some embodiments may be a wired local area network (LAN), a wireless personal area network (WPAN), a public Wi-Fi communication network, a private Wi-Fi communication network, a public WiMAX communication network, or other non-cellular communication networks. In other embodiments, the network 170 may be a wired wide area network (WAN), a 4G LTE public network, or a 5G communication network, or other cellular communication networks. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHz, or 6 GHz bands which may be shared communication frequency bands with WWAN protocols or Bluetooth® protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards. NRFR2 may include radio frequencies above 6 GHz, made available within the emerging 5G communications standard. Communications within NRFR1 may be enabled through the use of either an eNodeB executing an evolved packet core of an existing LTE system, or a Next Generation Node B (gNodeB) executing the next generation packet core of the 5G cellular standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In an embodiment, the network interface device 160 may be communicatively coupled to one or more antenna systems 163 used to provide one or more separate communication channels to the network 170. Such communications channels may be found in any communication network described herein. The antennas 163 may support Wi-Fi 6, Wi-Fi 6e, the emerging Wi-Fi 7, or a 5G wireless communication protocol so that relatively higher amounts of data may be transceived by the information handling system 100 to any communication network to which the information handling system 100 is communicatively coupled in some embodiments.

The antenna adaptation controller 162 may execute instructions as disclosed herein for monitoring wireless link state information, wireless link configuration data, network slice data, or other input data to generate channel estimation and determine antenna radiation patterns. For example, the antenna adaptation controller 162 in an embodiment may gather beacon data received from one or more nearby access points (APs) for the network 170 describing channels available for communication with that AP, as well as various current traffic metrics for communications on those channels. More specifically, such beacon information may provide a relative signal strength indicator (RSSI), identification of the network 170 as private or public, identification of the network 170 as compatible with multiple user, multiple input, multiple output (MU-MIMO) communications, high available data rate, levels of channel contention, and current load of communications at the AP. Such beacon data may include such measurements or indications for each of the channels within which the AP is capable of transceiving data, and the beacons may be received in regular intervals. Such received beacon data may be stored in an embodiment at the main memory 102, or in temporary BIOS memory accessible in kernel mode. Instructions or a controller may execute software or firmware applications or algorithms which utilize one or more wireless links for wireless communications via the network interface device 160 and the plurality of antenna systems 163 for the plurality of supported wireless protocols as well as other aspects or components.

Antenna adaptation controller 162 may also control selection from among an available plurality of antennas 163 via antenna switching or adjust antenna matching or antenna directionality in some cases for antenna systems 173. Such switching, matching, or directionality settings may be reported to the trained neural network 140 in an embodiment. Further, control over antenna switching, matching or directionality may provide corrective adjustments for service detected by the trained neural network 140.

The network interface device 160 in an embodiment may further include a radio subsystem 161 which may operate to modulate and demodulate signals transceived within a WWAN or WLAN format, set signal transmission power levels or sensitivity to signal reception, select channels or frequency bands, and conduct other functions in support of a wireless transmission from the information handling system 100 to the communication network 170.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 154 or receives and executes instructions, parameters, and profiles 154 responsive to a propagated signal, so that a device connected to a network 170 may communicate voice, video or data over the network 170. Further, the instructions 154 may be transmitted or received over the network 170 via the network interface device 160. The information handling system 100 may include a set of instructions 154 that may be executed to cause the computer system to perform any one or more of the methods or computer-based functions disclosed herein. For example, instructions 154 may include a particular example of an intelligent throughput performance analysis and issue detection system 150, or other aspects or components. Various software modules comprising application instructions 154 may be coordinated by an operating system (OS), and/or via an application programming interface (API). An example operating system may include Linux. Other examples may include Windows®, Android®, and other OS types. Example APIs may include Win 32, Core Java API, or Android APIs. Application instructions 154 may also include any application processing drivers, or the like executing on information handling system 100.

The intelligent throughput performance analysis and issue detection system 150 may utilize a computer-readable medium 152 in which one or more sets of instructions 154 such as software may be embedded. The instructions 154 may embody one or more of the methods or logic as described herein. For example, instructions relating to the intelligent throughput performance analysis and issue detection system 150, software algorithms, processes, and/or methods may be stored here. As explained, some or all of the intelligent throughput performance analysis and issue detection system 150 may be executed locally or remotely.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 154 of the intelligent throughput performance analysis and issue detection system 150 may be stored in static memory 103, or the drive unit 107 on a computer-readable medium 152 such as a flash memory or magnetic disk in an example embodiment. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the intelligent throughput performance analysis and issue detection system 150 that may be operably connected to the bus 108. The intelligent throughput performance analysis and issue detection system 150 may, according to the present description, perform tasks related to gathering connectivity metrics describing an environment in which a wireless link is established between the network interface device 160 and the network 170. For example, the intelligent throughput performance analysis and issue detection system 150 may gather various controlled connectivity testing metrics during testing of the information handling system 100, prior to shipment of the information handling system 100 to an end user. As another example, the intelligent throughput performance analysis and issue detection system 150 may gather various operational connectivity metrics during operation of the information handling system 100 in the field by the end user.

Controlled connectivity testing metrics and operational connectivity metrics in an embodiment may include, for example, antenna positional information, antenna adaptation controller parameters, signal strength measurements, and wireless link performance metrics. The intelligent throughput performance analysis and issue detection system 150 may retrieve from the antenna adaptation controller 162 of the network interface device 160 an identification of the model number for the network interface device 160. In other embodiments, this model number may also be stored within a laboratory-controlled connectivity testing metrics database (e.g., 280 shown in FIG. 2) located remotely from the information handling system 100. The intelligent throughput performance analysis and issue detection system 150 may further gather from the antenna adaptation controller 162 a Relative Signal Strength Indicator (RSSI) (e.g., taken from beacon data from an access point (AP) within the network 170), an identification of radiofrequency channel, a maximum allowable data bandwidth, transmission power measurement, receive power measurement, and a modulation coding scheme (MCS) and wireless protocol (e.g., IEEE 802.11ax) for coding or decoding of data frames transceived for a wireless link established with that AP. Antenna adaptation controller parameters may also include status of antenna switching for selection among antennas, matching for tuning an antenna to a frequency, or directionality adjustments. In an embodiment, path loss may be further determined by the intelligent throughput performance analysis and issue detection system 150 by dividing the transmission power measurement by the receive power measurement gathered by the antenna adaptation controller 162.

An internet speed test tool 122 may be invoked by the intelligent throughput performance analysis and issue detection system 150 (e.g., as a background application running through the command line interface). The internet speed test tool 122 in an embodiment may be used, alone or in tandem with the intelligent throughput performance analysis and issue detection system 150 to determine a link rate based on the distance between the information handling system 100 and the AP in network 170 with which the wireless link has been established.

The intelligent throughput performance analysis and issue detection system 150 in an embodiment may further operate to execute a trained neural network 140 to determine a predicted throughput value for wireless links established with the network 170 based on the controlled connectivity testing metrics or operational connectivity metrics gathered as described directly above. As described herein, the intelligent throughput performance analysis and issue detection system 150 may receive tuned or retuned weight matrices for the trained neural network 140 defining the method in which such predicted throughput values are determined from a remotely located neural network training platform 190 (e.g., as described in greater detail with respect to FIG. 2). The intelligent throughput performance analysis and issue detection system 150 in an embodiment may further communicate with such a remote neural network training platform to transmit an indication that the trained neural network 140 has output an erroneous predicted throughput value, along with all input values (e.g., operational connectivity metrics) used to generate the erroneous predicted throughput value, and the actual or measured throughput value. All communications with the remote neural network training platform 190 in such embodiments may be performed through a wireless link between the network interface device 160 and the network 170 or via Out-of-Band (OOB) communications across any available communication link/channel.

In an embodiment in which the trained neural network 140 outputs an erroneous predicted throughput value, the intelligent throughput performance analysis and issue detection system 150 may transmit an indication of such an erroneous output to the technical support software agent 130. The technical support software agent 130 in an embodiment may then automatically begin one or more remediation steps, or may transmit a message to a remote technical support center or system (e.g., as described below with respect to FIG. 2), to begin a process of remediation or reconfiguration of the information handling system 100, either through automatic steps taken by a software agent or by generating a ticket for an IT professional to begin such remediation. For example, antenna adaptation controller 162 may switch among available antennas, tune multi-frequency antennas for different bands, or adjust antenna directionality such as via phase shifting, use of parasitic elements or other similar techniques.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
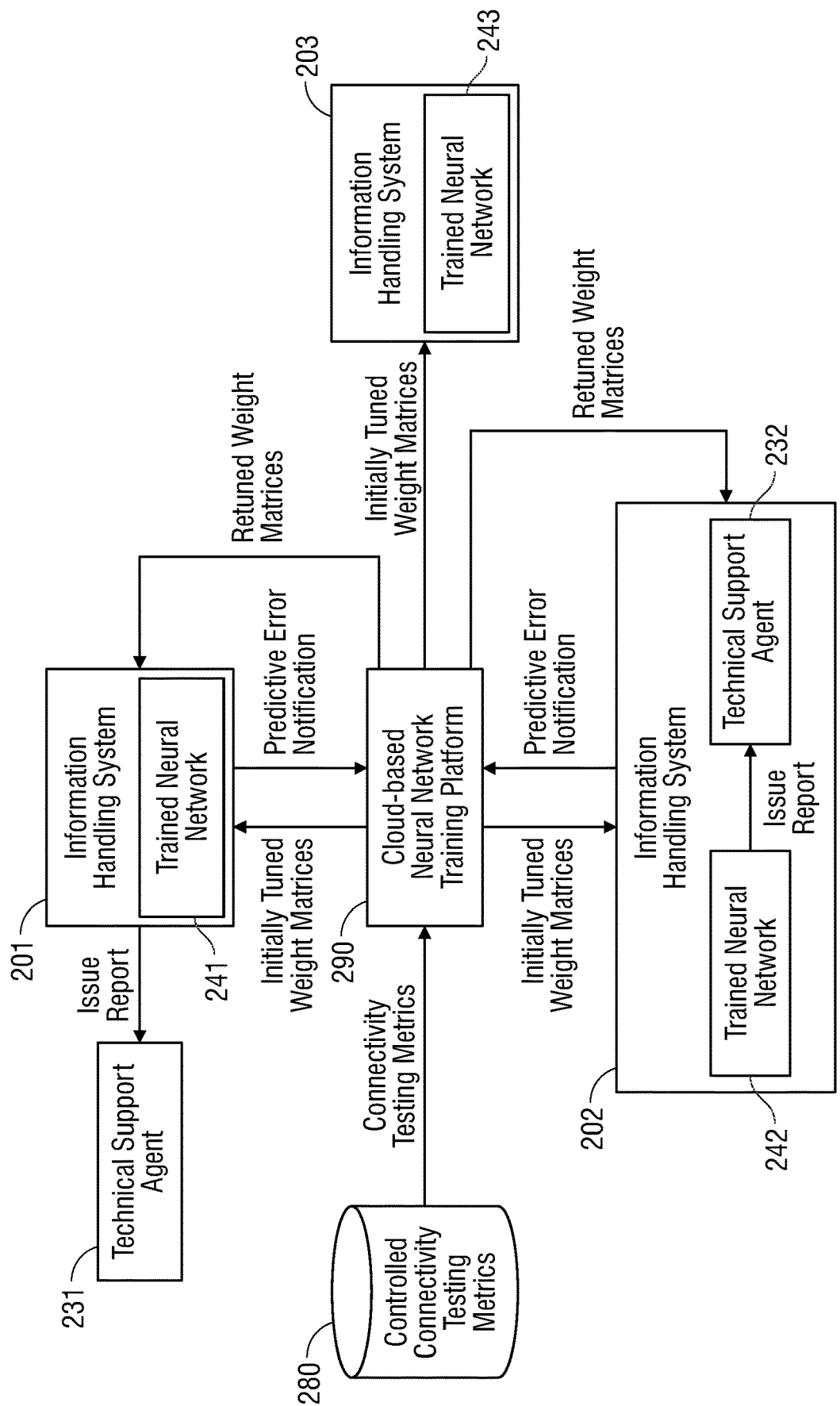
FIG. 2 is a block diagram illustrating a neural network training platform for training a neural network to predict wireless link throughput values according to an embodiment of the present disclosure.

FIG. 2 is a block diagram illustrating a cloud-based neural network training platform 290 for training and continuously retraining a neural network (e.g., 241, 242, or 243) to predict wireless link throughput values based on controlled connectivity testing metrics and operational connectivity metrics according to an embodiment of the present disclosure. As described herein, a cloud-based neural network training platform 290 in an embodiment may train the neural networks (e.g., 241, 242, and 243) at user information handling systems 102, 202, and 203. With operation of trained neural networks 241, 242, or 243 at information handling systems 201, 202, or 203, and reporting to cloud-based neural network training platform 290, the relationships between user network factors and environmental factors that are difficult to assess remotely, and the resultant throughput of wireless links may be established for those user information handling systems 2012, 202, or 203. This may assist in remote diagnosis of causes of low throughput at each of the information handling systems (e.g., 201, 202, or 203), and to consequently decrease the volume of technical support visits and calls.

The cloud-based neural network training platform 290 may initially train the neural network based on controlled connectivity testing metrics gathered from the laboratory-controlled connectivity testing metrics database 280 in an embodiment. Controlled connectivity testing metrics in an embodiment may describe antenna positional information, antenna adaptation controller parameters, signal strength measurements, and wireless link performance metrics for a plurality of information handling systems, for example of provider models undergoing testing in a laboratory prior to shipment to end users, for example. These controlled connectivity testing metrics in an embodiment may be gathered in a laboratory, using various components or software applications of each information handling system undergoing testing. For example, as described with reference to FIG. 1, above, antenna positional information may be determined, stored, or retrieved from one or more position or rotation sensors of sensor hub 111 or information handling system 100, an internet speed test tool 122, or the intelligent throughput performance analysis and issue detection system 150. Antenna adaptation controller parameters in an embodiment may be determined, stored, or retrieved from antenna adaptation controllers 161 of a network interface device 160. Signal strength measurements may be determined, stored, or retrieved from at the antenna adaptation controllers 161, or the internet speed test tool 122. Example speed test tools may include IxChariot® or iPerf®. Wireless link performance metrics may be determined, stored, or retrieved from the internet speed test tool 122, the intelligent throughput performance analysis and issue detection system 150, or the antenna adaptation controllers 161.

Each of these metrics may be measured during testing of a "reference device" representing a particular computing device or model in various embodiments. For example, in some embodiments all laptops may be associated with a single reference device, while all tablets are associated with a separate reference device. In another example embodiments, all laptops of a specific model, such as a Dell® Latitude laptop, may be associated with a single reference device. In still other example embodiments, a single reference device may represent a specific model and series or generation, such as a first reference device representing a Dell® Latitude 7000, and a second reference device representing a Dell® Latitude 9000. Such reference devices representing each of the information handling systems (e.g., 201, 202, and 203) in an embodiment may undergo in-depth laboratory-based testing of wireless performance, and the results of that testing may be stored within the laboratory-controlled connectivity testing metrics database 280 in an embodiment. The results of that testing may include a plurality of measurements of wireless performance and variables potentially impacting such wireless performance. For example, measurements such as antenna positional information, antenna adaptation controller parameters, signal strength measurements, and wireless link performance metrics may be observed for each reference device across a range of different signal attenuations. Antenna positional information measurements in an embodiment may include, for example, lid angle (e.g., a measured angle of a video display with respect to a base chassis and antenna locations on either), measured orientation or location of an antenna with respect to a radiofrequency transparent window of a chassis enclosing the antenna, or measured orientation or location of a primary antenna with respect to an auxiliary antenna. Antenna adaptation controller parameter measurements in an embodiment may include, for example, antenna type, antenna gains, radio frequency channel, modulation coding scheme (MCS) for coding or decoding of data frames transceived, network interface device model number, maximum allowable radio frequency (RF) bandwidth, or wireless protocol according to which the network interface device transceives wireless data via the wireless link. Signal strength measurements in an embodiment may include, for example, system noise profiles, signal strength measurements, Received Signal Strength Indicator (RSSI), maximum allowable data bandwidth, link data rate and modulation, or path loss.

In some cases, controlled connectivity testing metrics may be manually input into the laboratory-controlled connectivity testing metrics database 280 during testing of the reference devices for the information handling systems (e.g., 201, 202, and 203). For example, antenna positional information on the chassis of each reference device for the information handling system (e.g., 201, 202, or 203) tested in the laboratory, including a measured orientation or location of an antenna with respect to a radiofrequency transparent window of a chassis enclosing the antenna, or a measured orientation or location of a primary antenna with respect to an auxiliary antenna may be gathered during testing and stored within the laboratory controlled connectivity testing metrics database 280.

The laboratory-controlled connectivity testing metrics database 280 in an embodiment may store a large volume of these laboratory results that may form controlled connectivity testing metrics sets. Each set of such controlled connectivity testing metrics may include each of the above-described measurements made for a single signal attenuation on a single reference device, and may include at least one measure of wireless link throughput. As described above, each of these measurements for a single reference device may be repeated for a plurality of signal attenuations, and this repeated testing for a plurality of signal attenuations may be performed for a plurality (e.g., hundreds or even thousands) of different reference devices. Thus, the connectivity testing metrics database 280 may include thousands of such controlled connectivity testing metrics providing measured throughput values for each tested reference device, and several values (e.g., antenna positional information, antenna adaptation controller parameters, signal strength measurements, or wireless link performance metrics) describing the testing environment in which a wireless link with those reference devices were established. Each separate test and resulting information in an embodiment may comprise a single test set that may be used to train the neural network to accurately model the effect of laboratory environmental conditions (e.g., as described by the controlled connectivity testing metrics) on the measured throughput values, as described in greater detail below with respect to block 308 of FIG. 3.

In order to accurately predict the throughput value of a wireless link in any environmental conditions, the neural network training platform 290 may train the neural networks 241, 242, and 243 in such a way using a large number of testing sets stored at the laboratory-controlled connectivity testing metrics 280 (which may be co-located with or otherwise accessible to the neural network training platform 290), each measured in differing environmental conditions. The accuracy of the neural networks 241, 242, and 243 in modeling the relationship between throughput values and various environmental and operational conditions (e.g., as described by operational connectivity metrics gathered during operation of a plurality of information handling systems) may increase as the number of test sets retrieved from the laboratory controlled connectivity testing metrics database 280 and input into the neural network by the cloud-based neural network training platform 290 during training increases.

The cloud-based neural network training platform 290 in an embodiment may use a training method for neural networks (e.g., as described with respect to FIG. 3, below) to fine tune weight matrices of the neural network. These fine-tuned weight matrices may be transmitted from the cloud-based neural network training platform 290 to each of the information handling systems 201, 202 and 203. By loading the fine-tuned weight matrices into the trained neural networks 241, 242, and 243 in an embodiment, the information handling systems 201, 202, and 203, respectively, may enable the neural networks 241, 242, and 243, respectively, to accurately predict throughput values for wireless links established by each of the information handling systems 201, 202, and 203, during operation of those information handling systems 201, 202, and 203 by an end user in the field.

During such operation by the end user, an intelligent throughput performance analysis and issue detection system executing the trained neural networks 241, 242, and 243 on each of the information handling systems 201, 202, and 203, respectively, may continuously gather operational connectivity metrics (e.g., similar to the controlled connectivity testing metrics gathered during laboratory testing described above and used to train the neural network). The intelligent throughput performance analysis and issue detection system in an embodiment may execute the trained neural networks 241, 242, and 243 to routinely test their abilities to accurately predict throughput values based on these input operational connectivity metrics. The neural network 243 in an example embodiment may accurately predict throughput values for wireless links established during operation of the information handling system 203. In contrast, neural networks 241 and 242 may eventually output a predicted throughput value that is not within a preset tolerance of the measured or actual throughput of wireless links established during operation of information handling system 201 or 202, respectively.

When one of the trained neural networks (e.g., 241 or 242) fails to accurately predict throughput values for a specific set of operational connectivity metrics describing an environment in which an information handling system (e.g., 201 or 202) is being operating by the end user (e.g., in the field), this may indicate a need to retrain the neural networks (e.g., 241 or 242). In other words, the neural network initially trained by the cloud-based neural network training platform 290 using test sets of controlled connectivity testing metrics retrieved from the laboratory-controlled connectivity testing metrics database 280 may not have been trained to anticipate the effects of that specific environment on throughput values for wireless links established in that environment. Thus, the neural networks 241 and 242 in such an example embodiment may need to be retrained to more accurately model the relationship between measured throughput values and the specific set of operational connectivity metrics in which the information handling systems 201 and 202 are operating and that were input into the trained neural networks 241 and 242 to produce an erroneous or inaccurate predicted throughput value.

In order to facilitate such retraining of the neural networks (e.g., 241 or 242), the information handling systems (e.g., 201 or 202) executing the trained neural networks (e.g., 241 or 242) to output an erroneously predicted throughput value may transmit a notification of such an erroneous output to the cloud-based neural network training platform 290. The information handling systems 201 and 202 in an embodiment may also transmit the input values (e.g., operational connectivity metrics) that were input into the trained neural networks 241 and 242 at the information handling systems 201 and 202, respectively, to produce the erroneous output, and the measured throughput value (e.g., actual throughput value that did not match the predicted throughput value output by the neural network).

The neural network training platform 290 in an embodiment may then retrain the neural network to accurately model the relationship between these received operational connectivity metrics and the measured or actual throughput value. In such a way, the neural network training platform 290 may retrain the neural network to accurately anticipate the effects of the specific environment described by those operational connectivity metrics on throughput values for wireless links established in that environment. Upon retraining of the neural network in such a way, the neural network training platform 290 may transmit retuned weight matrices modeling the retrained neural network to each of the plurality of information handling systems 201, 202, and 203, for loading of a retrained neural network (e.g., by updating the trained neural networks 241, 242, and 243 to use the retuned weight matrices). By consistently testing, retraining, and updating the neural networks operating at each of the information handling systems 201, 202, and 203 in such a way, the intelligent throughput performance analysis and issue detection systems operating at each of the plurality of information handling systems 201, 202, and 203 and the neural network training platform 290 may efficiently and accurately model the influence of myriad environmental and network factors in which information handling systems 201, 202, and 203 may be operating on throughput values, for assisting in remotely diagnosing causes of low throughput.

In an embodiment in which the trained neural network (e.g., 241 or 242) outputs an erroneous predicted throughput value, the intelligent throughput performance analysis and issue detection system may transmit an indication of such an erroneous output to the technical support software agent. In some embodiments, such as that described above with respect to FIG. 1, the technical support software agent (e.g., 232) may operate onboard the information handling system (e.g., 202). In other embodiments, the technical support software agent (e.g., 231) may be located remotely from the information handling system (e.g., 201). The technical support software agent (e.g., 231 or 232) in either embodiment may then begin a process of remediation or reconfiguration of the information handling system (e.g., 201 or 202). This remediation process may also be triggered, in various embodiments, by low throughput values detected by the internet speed test tool, the Wi-Fi experience service, or the intelligent throughput performance analysis and issue detection system of the information handling system (e.g., 201, 202, or 203). In other embodiments, the technical support software agent (e.g., 231 or 232) may operate to issue a ticket for an IT professional technical support agent to manually perform one or more remediation steps, in coordination with the information handling system (e.g., 201 or 202) or with the users of those information handling systems (e.g., 201 or 202).

Figure 3:
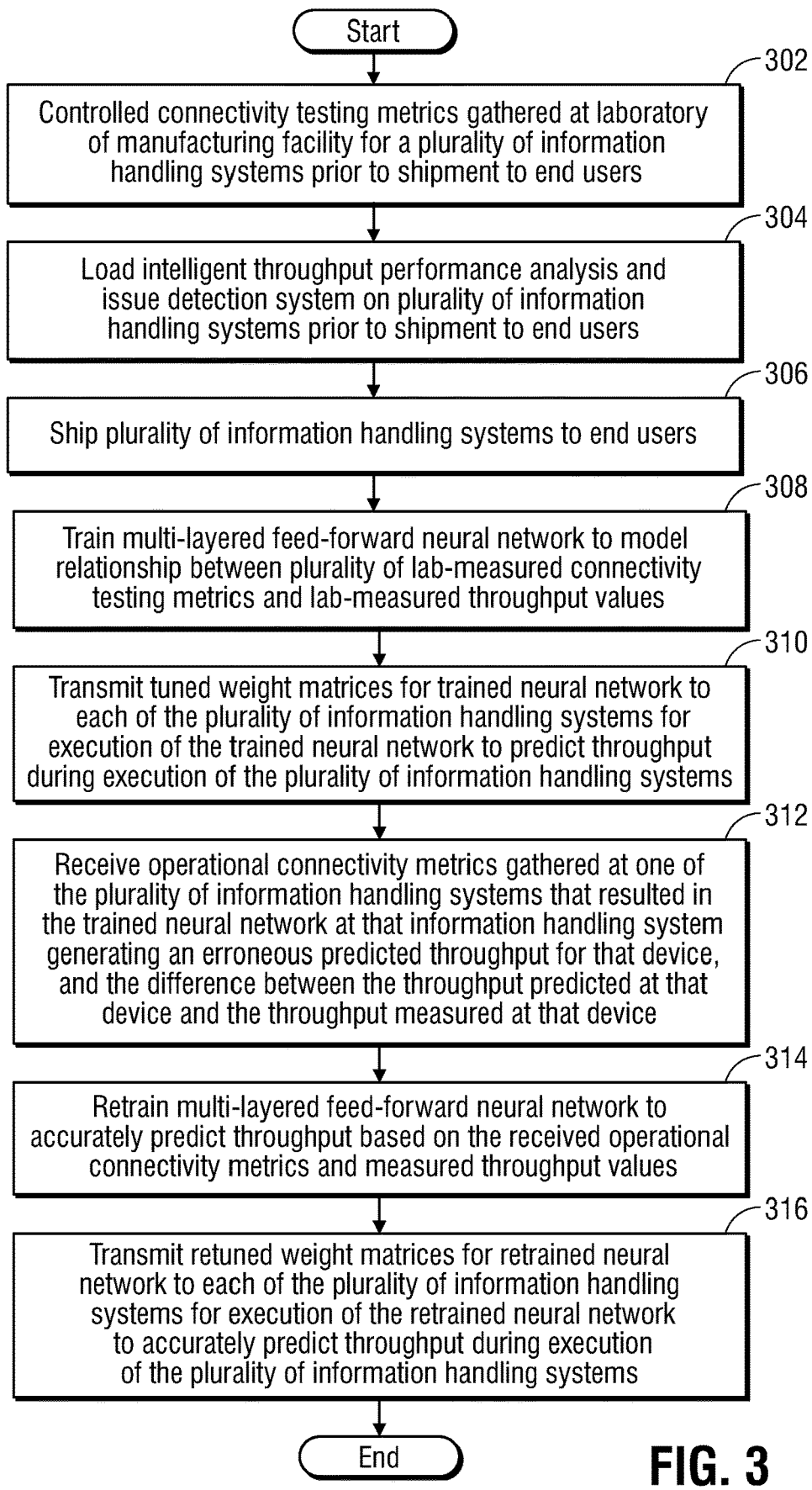
FIG. 3 is a flow diagram illustrating a method of training a neural network to predict throughput of wireless links according to an embodiment of the present disclosure.

FIG. 3 is a flow diagram illustrating a method of training and continuously updating a neural network to predict throughput of wireless links, based on controlled laboratory and operational measurements of connectivity metrics according to an embodiment of the present disclosure. As described herein, it is difficult to diagnose causes of low throughput at computing devices from a remote technical support center, due to the influence of network factors and environmental factors surrounding the computing device that cannot easily be detected or analyzed by remotely located technical support specialists. FIG. 3 describes a method of training and continuously updating a neural network capable of modeling relationships between these network factors and environmental factors that are difficult to assess remotely, and the resultant throughput of wireless links established by those information handling systems.

At block 302, controlled connectivity testing metrics may be gathered in an embodiment at a manufacturing facility or laboratory environment for a plurality of information handling systems prior to shipment to end users. For example, in an embodiment described with reference to FIG. 2, the neural network training platform 290 may train a neural network using controlled connectivity testing metrics describing antenna positional information, antenna adaptation controller parameters, signal strength measurements, and wireless link performance metrics stored at a laboratory controlled connectivity testing metrics database 280 for a plurality of information handling systems (e.g., 201, 202, and 203) undergoing testing in a laboratory prior to shipment to end users. For example, laboratory connectivity testing metrics stored at the database 280 may be gathered for similar information handling system models with antenna specifications that overlap.

Antenna positional information in an embodiment may include, for example, a measured angle of a video display with respect to a base chassis enclosing the network interface device, a measured angle between an antenna of the network interface device and a transmission or reception path of a wireless link, a measured orientation or location of an antenna with respect to a radiofrequency transparent window of a chassis enclosing the antenna, or a measured orientation or location of a primary antenna with respect to an auxiliary antenna. Antenna adaptation controller parameters in an embodiment may include, for example, identification of a radio frequency channel with which a wireless link is established, antenna selection among a plurality of available antennas, identification of a modulation coding scheme (MCS) for coding or decoding of data frames transceived via the wireless link, impedance matching settings for multi-band antennas, antenna transmission/reception directionality settings, identification of the network interface device model number, or identification of a wireless protocol according to which the network interface device transceives wireless data via a wireless link. Signal strength measurements in an embodiment may include, for example, a Received Signal Strength Indicator (RSSI), bit error rate (BER) or a path loss measurement for a wireless link. Wireless link performance metrics in an embodiment may include, for example, a link rate, or a maximum allowable data bandwidth for a wireless link.

The intelligent throughput performance analysis and issue detection system or agents thereof may be installed in an embodiment at each of the plurality of information handling systems prior to shipment to end users at block 304. For example, an intelligent throughput performance analysis and issue detection system agent may be loaded onto each of the information handling systems (e.g., 201, 202, and 203) for execution of a trained neural network (e.g., 241, 242, and 243, respectively) during operation of the information handling systems by end users. The neural network training platform 290 in an embodiment may further instruct the intelligent throughput performance analysis and issue detection system in an embodiment to model a neural network for later execution. Such an instruction may include, for example, an identification of the type of neural network that will be used, the number of hidden layers included within the neural network, and identification of each of the connectivity metrics that will be gathered by the information handling system (e.g., as described in greater detail with respect to block 406 of FIG. 4) and entered into the neural network as a node value within the input layer.

Figure 4:
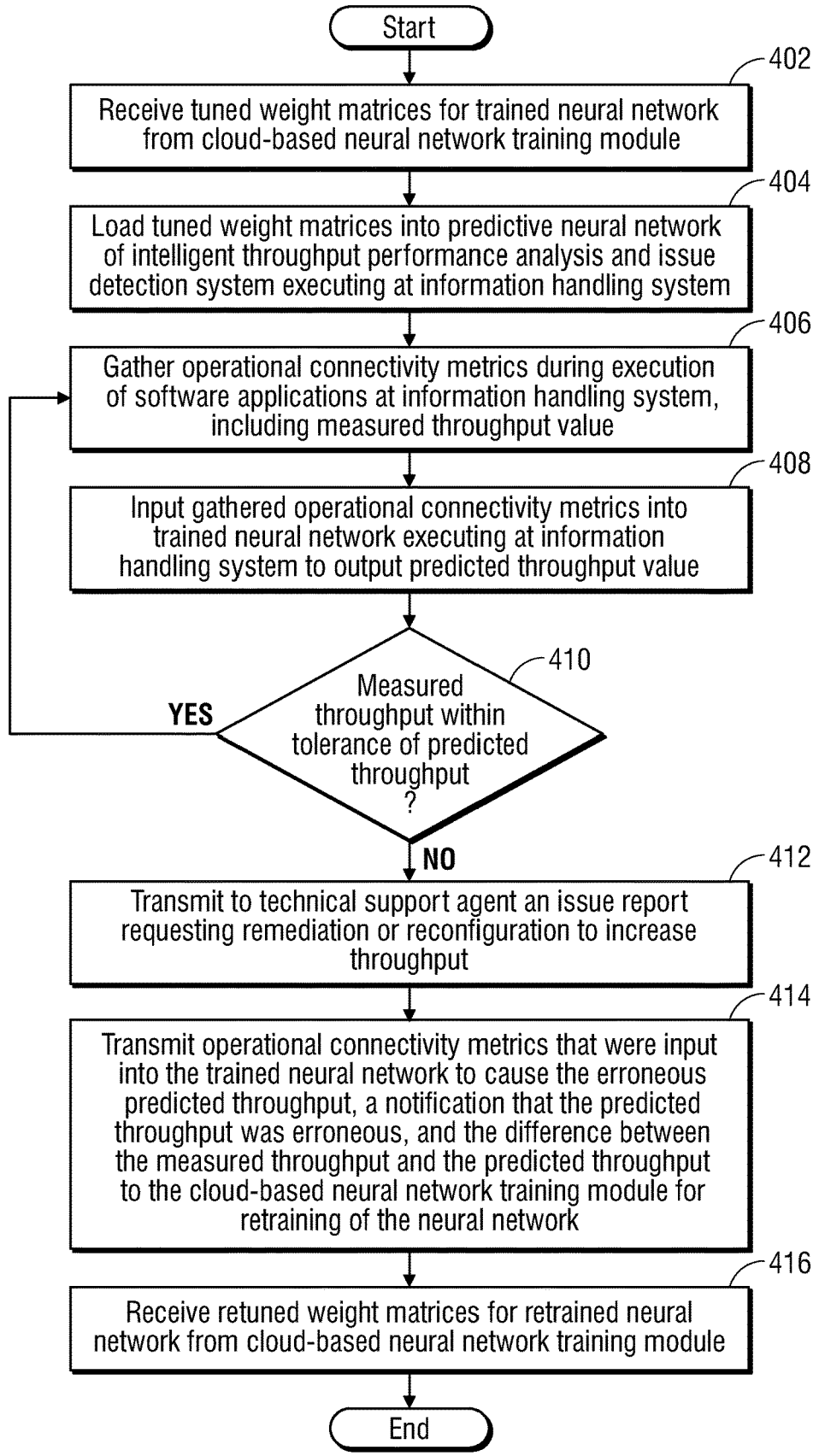
FIG. 4 is a flow diagram illustrating a method of executing a trained neural network to output a predicted throughput value according to an embodiment of the present disclosure.

The intelligent throughput performance analysis and issue detection system in such an embodiment may also be capable of gathering all required inputs for the trained neural network, determining when the neural network has output an inaccurate predicted throughput value, and prompting the cloud-based neural network training platform 290 to retrain the neural network based on this erroneous predicted throughput value (e.g., as described in greater detail with respect to FIG. 4, below).

At block 306, the plurality of information handling systems may be shipped to end users in an embodiment, for operation in environmental conditions that differ from the laboratory testing environment. As described herein with respect to FIG. 4 below, the intelligent throughput performance analysis and issue detection system agents loaded onto each of the information handling systems may routinely test the accuracy of trained neural networks executing at each of these information handling systems in order to improve the overall accuracy of the neural network in anticipating the effects of various environmental conditions on wireless link throughput values.

A multi-layered feed-forward neural network may be trained in an embodiment at block 308 at a remote or cloud-based neural network training platform to model the relationship between the plurality of lab-measured controlled connectivity testing metrics and the lab-measured throughput values gathered at block 302. For example, the multi-layered feed-forward neural network in an embodiment may include a multi-layer perceptron neural network, or a Residual Net model designed using the Python® programming language. The multi-layer feed-forward neural network in an embodiment may include an input layer, a plurality of hidden layers, and an output layer, each containing one or more nodes having specific values. The input layer node values in an embodiment may include each of the connectivity testing metric values gathered at block 302, for example. The output layer may include one or more nodes including throughput values, such as transmission throughput, or reception throughput values.

Each of the nodes in a layer (e.g., the first hidden layer or the output layer) may be interrelated to each of the nodes in a preceding layer (e.g., the input layer, or the last hidden layer, respectively) through a weighted sigmoid function describing a degree to which the value of a node of a later layer impacts the value of a node in an earlier layer. During training, these weights may be set to a preset value (e.g., 0, 1, or some value in between) as a best guess. Each node in a later layer may thus be associated with an array of weight values, with each weight value describing the impact the value of one of the nodes in the earlier layer has on the value of the later layer node associated with the array. In other words, one of a plurality of nodes in a layer may be associated with an array that includes a plurality of weight values. A weight matrix for the entire layer may be generated in an embodiment by combining the arrays associated with each of the nodes in that layer into a single matrix. In such a way, a weight matrix may be generated for a layer, defining the impact that the values of each of the nodes in an earlier layer has on the values of each of the nodes in that layer. Such a weight matrix may be generated for each of the layers in the neural network.

As described herein, the initial weight matrices defined during a training session may form best guesses as to the interrelationships between the node values. The cloud-based neural network training platform in an embodiment may use a forward-propagation and back-propagation method to adjust the values of these weight matrices in order to more accurately mode the interrelationships between the node values. For example, the neural network training platform 290 in an embodiment described with reference to FIG. 2 above may retrieve a first set of controlled connectivity testing metrics, including a throughput value for a wireless link measured in a laboratory, and several values (e.g., antenna positional information, antenna adaptation controller parameters, signal strength measurements, or wireless link performance metrics) describing the testing environment in which such a wireless link was established. This information may be retrieved, for example, from the laboratory-controlled connectivity testing metrics database 280, in which a large volume of these information sets may be stored. For example, this laboratory-controlled connectivity testing metrics database 280 may include such testing information for thousands or millions of information handling systems tested for wireless link performance prior to shipment to end users. Laboratory controlled connectivity testing metrics may be stored by models of information handling systems or layouts and deployment of available antennas, such as available Wi-Fi antennas that are deployed in the information handling system. Each separate test and resulting information in an embodiment may comprise a single test set that may be used to train the neural network.

Upon retrieving a test set of such information from the laboratory-controlled connectivity testing metrics database 280 in an embodiment, the neural network training platform 290 may input the controlled connectivity testing metrics into the neural network, and forward-propagate these values through the neural network to output an initial predicted throughput value for a wireless link established in the environment described by the controlled connectivity testing metrics. Such a forward-propagation method in an embodiment may involve determining the values of each of the nodes of each of the hidden layers and the output layer based on the values of the input nodes and upon the weight matrices associated with each of these layers. The neural network training platform 290 in an embodiment may then determine an initial error function for this initial forward-propagation equivalent to the difference between the initial predicted throughput value output during the initial forward-propagation and the measured throughput value known to be accurate. In other words, the initial error function may describe a degree to which the initial forward-propagation method inaccurately predicted the throughput value of the wireless link established in the environment described by the controlled connectivity testing metrics.

In order to increase the ability of the neural network to accurately predict the throughput value in such a way, the initial error function in an embodiment may be back-propagated through each layer of the neural network. Such a back-propagation method may include adjusting the values of each of the weight matrices, using the initial error function, to more accurately depict the interrelationship between each of the nodes in each of the layers. An adjusted weight matrix for each of the layers may be produced during such an initial back-propagation. The neural network training platform in an embodiment may then forward-propagate and back-propagate the same set of input values repeatedly until the neural network outputs a predicted throughput value that falls within a preset tolerance (e.g., 1%, 2%, 5%) of the measured throughput value. In such a way, the neural network training platform in an embodiment may train the neural network to accurately model the relationship between the controlled connectivity testing metrics for that specific testing set and the measured throughput value for that specific testing set.

In order to accurately predict the throughput value of a wireless link in any environmental conditions, the neural network training platform may train the neural network in such a way using a large number of testing sets, each measured in differing environmental conditions. The accuracy of the neural network in modeling the relationship between throughput values and various environmental and operational conditions (e.g., as described by operational connectivity metrics gathered during operation of a plurality of information handling systems) may increase as the number of test sets input into the neural network during training increases. By leveraging the large volume of such testing sets gathered during routine testing of information handling systems prior to shipment, the neural network training platform in an embodiment may substantially increase the ability to predict the effect that each of these environmental conditions may have on throughput of wireless links.

As described herein, each of these connectivity metrics may be measured in the laboratory at block 302 prior to shipping of the information handling system to an end user. As also described below with respect to FIG. 4, many of these connectivity metrics may be measured during operation of the information handling system by the user (e.g., "in the field"). The measurements taken during testing in the laboratory (e.g., at block 302) may differ in value from the measurements taken during operation of the information handling system in the field (e.g., as described at block 406 of FIG. 4) because the laboratory setting may not be capable of reproducing the environment in which the information handling system may operate within in the field. For example, the operational environment of the information handling system may include several different types, configurations, or orientations of barriers (e.g., walls, buildings, trees, cars, other interfering networks, etc.) to propagating signals used to establish wireless links or sources of interference such as other wireless links or access points. Thus, training a neural network to model the relationship between throughput of wireless links and the controlled connectivity testing metrics gathered during the testing phase may not allow the neural network to anticipate the effect of these untested operational environmental conditions on throughput. As a consequence, retraining of the neural network may be required, as described in greater detail with respect to blocks 312 and 314 below.

At block 310, tuned weight matrices for the trained neural network may be transmitted in an embodiment to each of the plurality of information handling systems for execution of the trained neural network to predict throughput during operation of the plurality of information handling systems by the end users. As described above with respect to block 308, the neural network training platform in an embodiment may train the neural network by repeatedly adjusting the weight matrices of each layer of the model based on forward and back-propagation of a large volume of testing sets, where each testing set includes each of the controlled connectivity testing metrics gathered at block 302. Thus, the result of such a training method is a finely tuned set of weight matrices defining the impact of the input node values (e.g., controlled connectivity testing metrics) on resultant throughput values in the output node or nodes (e.g., transmission throughput and reception throughput). As also described above at block 304, the neural network training platform in an embodiment may have pre-loaded a description of the neural network model, including the number of hidden layers, and an identification of the inputs for the input layer into each of a plurality of information handling systems. The neural network training platform in an embodiment may quickly and efficiently enable the intelligent throughput performance analysis and issue detection system agents operating in each of a large plurality (e.g., potentially hundreds, thousands, or millions) of information handling systems to execute such neural networks by transmitting to those information handling systems located across the globe the tuned weight matrices for the trained neural network. Additionally, those large plurality of information handling systems may also have determined subsets for similar models, or available antennas and antennas layouts on the information handling system chassis that may provide additional accuracy or throughput prediction. This may avoid transmission of the full neural network model itself, and offload accuracy testing of the neural network to each of the information handling systems, respectively.

Operational connectivity metrics gathered at one of the plurality of information handling systems may be received in an embodiment at block 312. This may occur, for example, when one of the information handling systems executes the neural network modeled by the weight matrices transmitted at block 310, but the neural network outputs a predicted throughput value that differs from a measured throughput value. This may indicate, in an embodiment, that the weight matrices tuned at block 308 and transmitted at block 310 cannot accurately predict the relationship between the connectivity metrics gathered during operation of the information handling system and the measured throughput at that information handling system. In other words, this may demonstrate a need to adjust the weight matrices to anticipate the effect that the specific environmental conditions experienced by the information handling system at that point in time may have on throughput of wireless links. In such a scenario, the information handling system whose neural network produced an erroneous predicted throughput value may transmit information back to the neural network training platform needed to retrain the neural network. This information in an embodiment may include, for example, a notification that an erroneous throughput value has been predicted, the value of the erroneously predicted throughput value, the value of the measured or actual throughput, and any operational connectivity metrics gathered by the information handling system and input into the neural network executing at that information handling system to produce the erroneous predicted throughput value, as described in greater detail below with respect to FIG. 4.

At block 314, the multi-layered feed-forward neural network in an embodiment may be retrained at the remote neural network training platform to accurately predict throughput of wireless links based on the operational connectivity metrics and measured throughput values received at block 312. As described herein, accuracy of the neural network in modeling the relationship between throughput values and various environmental and operational conditions (e.g., as described by operational connectivity metrics gathered during operation of a plurality of information handling systems) may increase as the number of test sets input into the neural network during training increases. Thus, in order to increase the accuracy of the neural network, the neural network training platform in an embodiment may input the operational connectivity metrics received at block 312, and retune the weight matrices of the neural network using the same forward and back-propagation method described above with respect to block 308. Such retuned weight matrices in an embodiment may then accurately model the interrelationship between the specific operational connectivity metrics and the measured throughput value received at block 312. By retraining the neural network in such a way to further anticipate the effect of various operational environments on wireless link throughput, the neural network training platform in an embodiment may substantially increase the ability to predict the effect that each of these environmental conditions may have on throughput of wireless links.

The remote neural network training platform in an embodiment may transmit the retuned weight matrices for the retrained neural network to each of the plurality of information handling systems for execution of the retrained neural network to accurately predict throughput during operation of the plurality of information handling systems at block 316. Upon retraining of the neural network in such a way, the neural network training platform may transmit retuned weight matrices modeling the retrained neural network to each of the plurality of information handling systems, for loading of a retrained neural network. By consistently testing, retraining, and updating the neural networks operating at each of the information handling systems in such a way, the intelligent throughput performance analysis and issue detection systems operating at each of the plurality of information handling systems and the neural network training platform may efficiently and accurately model the influence of myriad network factors and environmental factors in which information handling systems may be operating on throughput values, for assisting in remotely diagnosing causes of low throughput. The method may then end.

FIG. 4 is a flow diagram illustrating a method of executing a trained neural network at an end user information handling system to output a predicted throughput value for one or more wireless links, based on varying operational and environmental conditions according to an embodiment of the present disclosure. As described herein, the accuracy of the neural network in modeling the relationship between throughput values and various environmental and operational conditions (e.g., as described by operational connectivity metrics gathered during operation of a plurality of information handling systems) may increase as the number of test sets input into the neural network during training increases. However, it may not be feasible to train the neural network based on all operational connectivity metrics gathered by each of the plurality of information handling systems during the life of their operation, as this may include an enormous volume of information. In order to balance these competing interests, each of the plurality of information handling systems may routinely execute the neural network based on recently gathered operational connectivity metrics in order to routinely test the accuracy of the trained neural network. When an information handling system detects an inability of the trained neural network to accurately predict the throughput based on the most recently gathered operational connectivity metrics in an embodiment, that information handling system may prompt retraining of the neural network at the remote neural network training platform to specifically target the operational connectivity metrics that produced the erroneously predicted throughput value at the information handling system. In such a way, the remote neural network training platform in an embodiment may continuously retrain or update the neural network in an efficient manner that avoids duplicated efforts or training of the neural network using the same input values repeatedly.

The retrained neural network in such an embodiment may thus be capable of more accurately predicting throughput values based on varying environmental and operating conditions of the information handling system, as those conditions change in real time. By repeating this method for each of the plurality of information handling systems tested by the manufacturer or served by the technical support service, the neural network may be trained and routinely updated (e.g., retrained based on updated environmental and operating conditions for all of the information handling systems) to consistently and accurately model the relationship between throughput and these varying conditions.

At block 402, an information handling system operated by an end user may receive tuned weight matrices for a trained neural network from a cloud-based neural network training platform in an embodiment. For example, as described with respect to block 310 of FIG. 3, the neural network training platform in an embodiment may train the neural network by repeatedly adjusting the weight matrices of each layer of the model based on forward and back-propagation of a large volume of testing sets, resulting in a finely tuned set of weight matrices defining the impact of the input node values (e.g., controlled connectivity testing metrics) on resultant throughput values in the output node or nodes (e.g., transmission throughput and reception throughput). The neural network training platform in an embodiment may thus quickly and efficiently enable execution of the trained neural network on potentially hundreds, thousands, or millions of information handling systems located across the globe. This may avoid transmission of the full neural network model itself, and offload accuracy testing of the neural network to each of the information handling systems, respectively.

The intelligent throughput performance analysis and issue detection system executing at the information handling system in an embodiment may load the tuned weight matrices into the predictive neural network at block 404. As also described above at block 304 of FIG. 3 above, the neural network training platform in an embodiment may have pre-loaded a description of the neural network model, including the number of hidden layers, and an identification of the inputs for the input layer into each of a plurality of information handling systems. The intelligent throughput performance analysis and issue detection system may load the weight matrices received at block 402 into the neural network model initially installed at the information handling system in such a way. Loading the weight matrices in an embodiment may involve associating each weight matrix with its corresponding layer of the modeled neural network as initially loaded. This may influence the result of forward propagation methods employed during later accuracy testing, as described below with respect to block 408.

At block 406, the information handling system may gather operational connectivity metrics during execution of software applications at the information handling system, including measured throughput values in an embodiment. During operation by the end user, an intelligent throughput performance analysis and issue detection system executing the trained neural networks on each of the information handling systems may continuously gather operational connectivity metrics (e.g., similar to the controlled connectivity testing metrics gathered during laboratory testing described above with respect to block 302 at FIG. 3, used to train the neural network). For example, the information handling system may continuously or routinely gather operational connectivity metrics describing measured throughput of wireless links, antenna positional information, antenna adaptation controller parameters, signal strength measurements, and wireless link performance metrics measured or in effect during operation of the information handling system in the field by the end user. As described herein, many of these operational connectivity metrics may differ in value from the measurements taken during testing in the laboratory (e.g., at block 302 of FIG. 3), because the laboratory setting may not be capable of reproducing the environment in which the information handling system may operate within in the field. For example, the operational environment of the information handling system may include several different types, configurations, or orientations of barriers (e.g., walls, buildings, trees, cars, other interfering networks, etc.) to propagating signals used to establish wireless links.

The intelligent throughput performance analysis and issue detection system in an embodiment may input the operational connectivity metrics gathered at block 406 into the trained neural network to output a predicted throughput value at block 408. The intelligent throughput performance analysis and issue detection system in an embodiment may execute the trained neural networks to routinely test their abilities to accurately predict throughput values based on these input operational connectivity metrics. This may be achieved by forward-propagating the input values gathered at block 406 through the neural network to output a predicted throughput value. Because the weight matrices loaded into the neural network at block 404 have been tuned to accurately predict the effect of these values on wireless link throughput values, the output throughput value or values (e.g., transmission throughput and reception throughput) should be close to the throughput of wireless links measured at block 406.

At block 410, the intelligent throughput performance analysis and issue detection system in an embodiment may determine whether a difference between the predicted throughput value output by the neural network at block 408 and the measured throughput value gathered at block 406 falls within a preset tolerance value. Because the operational connectivity metrics may differ in value from the measurements taken during testing in the laboratory the neural networks trained using the controlled connectivity testing metrics gathered in the laboratory may not effectively train the neural network to anticipate the effect of untested operational environmental conditions on throughput. As a consequence, retraining of the neural network may be required, as described in greater detail with respect to blocks 414, and 416 below, and blocks 312 and 314 of FIG. 3, above. If the difference between the predicted throughput value and the measured throughput value does not fall within the preset tolerance value, this may indicate the neural network is not accurately modeling the relationship between the throughput value and the operational connectivity metrics gathered at block 406, and the method may proceed to block 412 to prompt retraining of the neural network. If the difference between the predicted throughput value and the measured throughput value falls within the preset tolerance value, this may indicate the neural network is accurately modeling the relationship between the throughput value and the operational connectivity metrics gathered at block 406, and the method may proceed back to block 406 to continue to gather updated operational connectivity metrics. By repeating the loop between blocks 406 and 410, the intelligent throughput performance analysis and issue detection system operating at the information handling system may continuously gauge the accuracy of the trained neural network.

At block 412, in an embodiment in which the difference between the predicted throughput value output at block 408 and the measured throughput value gathered at block 406 does not fall within the preset tolerance value, an issue report requesting remediation or reconfiguration of the information handling system may be transmitted to a technical support software agent. Remediation or reconfiguration at the device level, system level, or environmental level may be suggested or automated by a technical support software agent in response, for example. At the device level, a technical support software agent may, for example, suggest resetting of wireless links, updating or rolling back of drivers, or updating or renewing IP configuration or network configuration. At the system level, a technical support software agent may, for example, suggest a warm or cold boot, a clean shutdown, disabling of various applications, or a hardware function check. At the environmental level, a technical support software agent may, for example suggesting moving the information handling system to a new location, changing the channel or band of the wireless link, or connecting to a different network AP. Each of these remediation or reconfiguration steps in other embodiments may be performed by an IT professional in response to a ticket generated by a technical support software agent.

A notification of an erroneous output from the neural network and any information needed to retrain the neural network may be transmitted by the information handling system to the remote neural network training platform in an embodiment at block 414. As described above, the neural network may need to be retrained in an embodiment in which it has output an erroneous predicted throughput value. This may occur when the neural network has not been adequately trained to anticipate throughput based on the specific set of conditions in which the throughput measured at block 406 were also gathered. In order to retrain the neural network, the operational connectivity metrics gathered at block 406 that produced the erroneous predicted throughput value at block 408 may be transmitted to the remote neural network training platform. The intelligent throughput performance analysis and issue detection system in such an embodiment may further transmit the predicted throughput value output by the neural network at block 408, and the throughput value measured at block 406. The remote neural network training platform in an embodiment may then retrain the neural network to accurately anticipate throughput based on the transmitted operational connectivity metrics transmitted at block 414, as described in greater detail above at block 314 of FIG. 3.

At block 416, the intelligent throughput performance analysis and issue detection system of the information handling system may receive retuned weight matrices for a retrained neural network from the remote neural network training platform in an embodiment. As described above with respect to FIG. 3 at block 316, these retuned weight matrices may accurately model the relationship between throughput and the operational conditions described by the operational connectivity metrics transmitted to the remote neural network training platform at block 414. The retrained neural network in such an embodiment may thus be capable of more accurately predicting throughput values based on varying environmental and operating conditions of the information handling system, as those conditions change in real time. By repeating this method for each of the plurality of information handling systems tested by the manufacturer or served by the technical support service, the neural network trained and routinely updated (e.g., retrained based on updated environmental and operating conditions for all of the information handling systems) to consistently and accurately model the relationship between throughput and these varying conditions. The retuned neural network may then be used at the user information handling system to detect issues with a given wireless link and make adjustments such as re-selection among antennas, redirection of directionality for one or more antennas, re-tuning for band adjustment of antennas, updating or rolling back of drivers, or other remediation. The method may then end.

The blocks of the flow diagrams of FIGS. 3 and 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A first information handling system executing an intelligent throughput performance analysis and issue detection system, comprising:
   a network interface device to establish a wireless link with a wireless network;
   a processor to execute code instructions of a neural network of the intelligent throughput performance analysis and issue detection system trained to predict throughput values at the information handling system based on controlled connectivity testing metrics gathered from a plurality of tested information handling systems that includes the first information handling system;
   the processor to execute code instructions of the intelligent throughput performance analysis and issue detection system to:
     gather a measured throughput of the wireless link;
     gather operational connectivity metrics for the information handling system that describe antenna positional information, antenna gains, antenna adaptation controller parameters, system noise profiles, signal strength measurements, and wireless link performance metrics;
     output from the trained neural network a first predicted throughput value based on the gathered operational connectivity metrics; and
     determine a diagnosed cause operational connectivity metric causing low throughput of the measured throughput for the wireless link from the gathered operational connectivity metrics based on the first predicted throughput value at the information handling system from the trained neural network associated with the operational connectivity metrics relative to a higher predicted throughput set of operational connectivity metrics; and
   the network interface device to transmit a notification of the diagnosed cause operational connectivity metric for the low throughput of the first information handling system to a remote neural network training platform.

2. The information handling system of claim 1, wherein the antenna positional information includes a measured angle of a video display chassis with respect to a base chassis enclosing the network interface device.

3. The information handling system of claim 1, wherein the antenna adaptation controller parameters include identification of a radio frequency channel with which the wireless link is established.

4. The information handling system of claim 1, wherein the signal strength measurements include an Received Signal Strength Indicator (RSSI) level.

5. The information handling system of claim 1, wherein the wireless link performance metrics include a maximum allowable data bandwidth for the wireless link.

6. The information handling system of claim 1 further comprising:
   the processor for executing code instructions of the intelligent throughput performance analysis and issue detection system to determine a difference between the measured throughput of the wireless link and the first predicted throughput value based on the gathered operational connectivity metrics; and
   the processor to apply retuned weight matrices received from the remote neural network training platform directing the trained neural network to adjust to a second predicted throughput value within a maximum tolerance of the measured throughput based on the input operational connectivity metrics for the information handling system.

7. The information handling system of claim 1 further comprising:
   the network interface device for transmitting to a remote technical support software agent an issue report requesting remediation or reconfiguration of the information handling system to increase throughput.

8. A method of operating a trained neural network for an intelligent throughput performance analysis and issue detection system, comprising:
- executing, via a hardware processor, code instructions of the trained neural network of the intelligent throughput performance analysis and issue detection system to generate a first predicted throughput value for a first information handling system, where the trained neural network of the intelligent throughput performance analysis and issue detection system is trained by inputting controlled connectivity testing metrics for each of a plurality of test information handling systems for each wireless link including a test measured throughput value and controlled connectivity testing metrics describing antenna positional information, antenna adaptation controller parameters, signal strength measurements, and wireless link performance metrics with back-propagating to minimize a first error signal measuring a difference between the test predicted throughput value and the test measured throughput value;
- executing the code instructions of the trained neural network of the intelligent throughput performance analysis and issue detection system to gather measured throughput during transceiving of data via a first wireless link by the first information handling system;
- executing the code instructions of the trained neural network of the intelligent throughput performance analysis and issue detection system to gather operational connectivity metrics including the antenna positional information, the antenna adaptation controller parameters, the signal strength measurements, and the wireless link performance metrics for the first information handling system; and
- executing the code instructions of the trained neural network of the intelligent throughput performance analysis and issue detection system to determine a diagnosed cause among the operational connectivity metrics causing low throughput of the measured throughput for the first wireless link from the gathered operational connectivity metrics based on the first predicted throughput value of the first information handling system from the trained neural network associated with the operational connectivity metrics compared to a higher predicted throughput set of operational connectivity metrics; and
- transmitting, via a network interface device, a notification of the diagnosed cause among the operational connectivity metrics for the low throughput of the first information handling system to a remote neural network training platform.

9. The method of claim 8, wherein the wireless link performance metrics include a maximum allowable radio frequency (RF) bandwidth for the wireless link.

10. The method of claim 8, wherein the antenna positional information includes a measured orientation or location of an antenna with respect to a radiofrequency transparent window of a chassis enclosing the antenna.

11. The method of claim 8, wherein the antenna adaptation controller parameters include identification of a modulation coding scheme (MCS) for coding or decoding of data frames transceived via the wireless link.

12. The method of claim 8, wherein the antenna adaptation controller parameters include identification of the network interface device model number.

13. The method of claim 8 further comprising:
- receiving from the first information handling system, via the network interface device, a notification of a predicted throughput value output from the trained neural network executing at the first information handling system based on the operational connectivity metrics for the first information handling system that is erroneous relative to an operational measured throughput value gathered for the first information handling system; and
- retraining the neural network by inputting the operational connectivity metrics and back-propagating to minimize a second error signal measuring a difference between an updated predicted throughput value and the operational measured throughput value.

14. The method of claim 8 wherein the trained neural network for an intelligent throughput performance analysis and issue detection system includes a modeled relationship between the controlled connectivity testing metrics and a test predicted throughput value for wireless links transceiving data according to the controlled connectivity testing metrics with a multi-layer, feed-forward neural network.

15. An information handling system executing an intelligent throughput performance analysis and issue detection system, comprising:
- a network interface device to establish a wireless link with a wireless network;
- a processor to execute code instructions of a neural network of the intelligent throughput performance analysis and issue detection system trained to predict throughput values at the information handling system based on controlled connectivity testing metrics gathered in a controlled laboratory from a plurality of tested information handling systems that includes the information handling system;
- the processor to execute code instructions of the intelligent throughput performance analysis and issue detection system to:
  - gather a measured throughput of the wireless link and operational connectivity metrics for the information handling system that describe antenna positional information, antenna adaptation controller parameters, signal strength measurements, and wireless link performance metrics;
  - output from the trained neural network a first predicted throughput value based on the gathered operational connectivity metrics; and
  - determine a difference does not exceed a maximum tolerance between the first predicted throughput value and the measured throughput;
  - determine a diagnosed cause operational connectivity metric causing low throughput of the measured throughput for the wireless link from the gathered operational connectivity metrics based on the first predicted throughput value at the information handling system from the trained neural network associated with the operational connectivity metrics relative to a higher predicted throughput set of operational connectivity metrics; and
- the network interface device to transmit a notification of the diagnosed cause operational connectivity metric for the low throughput of the first information handling system to a remote neural network training platform.

16. The information handling system of claim 15, wherein the antenna positional information includes a measured orientation or location of a primary antenna with respect to an auxiliary antenna.

17. The information handling system of claim 15, wherein the antenna adaptation controller parameters include identification of a wireless protocol according to which the network interface device transceives wireless data via the wireless link.

18. The information handling system of claim 15, wherein the signal strength measurements include a path loss measurement.

19. The information handling system of claim 15, wherein the wireless link performance metrics include a link data rate and modulation.

20. The information handling system of claim 15 further comprising:
   the processor for executing code instructions of the intelligent throughput performance analysis and issue detection system to determine a difference exceeding a maximum tolerance between the first predicted throughput value and the measured throughput; and
   the processor to apply retuned weight matrices received from the remote neural network training platform to direct the trained neural network to output a second predicted throughput value within the maximum tolerance of the measured throughput based on the input operational connectivity metrics.

\* \* \* \* \*